United States Patent
Robinson et al.

(10) Patent No.: US 11,986,856 B2
(45) Date of Patent: May 21, 2024

(54) HIGH POWER MICROBEAMFORMER ULTRASOUND TRANSDUCER PROBE

(71) Applicant: KONINKLIJKE PHILIPS N.V., Eindhoven (NL)

(72) Inventors: Andrew Lee Robinson, Kenmore, WA (US); Haifeng Wang, State College, PA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 909 days.

(21) Appl. No.: 16/959,452

(22) PCT Filed: Dec. 26, 2018

(86) PCT No.: PCT/EP2018/086873
§ 371 (c)(1),
(2) Date: Jul. 1, 2020

(87) PCT Pub. No.: WO2019/134878
PCT Pub. Date: Jul. 11, 2019

(65) Prior Publication Data
US 2021/0068786 A1    Mar. 11, 2021

Related U.S. Application Data

(60) Provisional application No. 62/612,831, filed on Jan. 2, 2018.

(51) Int. Cl.
*B06B 1/06* (2006.01)
*G01S 7/52* (2006.01)
*G01S 15/89* (2006.01)

(52) U.S. Cl.
CPC ............ *B06B 1/0611* (2013.01); *B06B 1/064* (2013.01); *G01S 7/5202* (2013.01); *G01S 7/5208* (2013.01); *G01S 15/8915* (2013.01)

(58) Field of Classification Search
CPC ..... B06B 1/0611; B06B 1/064; B06B 1/0215; B06B 2201/20; B06B 2201/55;
(Continued)

(56) References Cited

U.S. PATENT DOCUMENTS

| | | | |
|---|---|---|---|
| 5,744,898 | A | 4/1998 | Smith et al. |
| 6,664,717 | B1 | 12/2003 | Mohr, III et al. |

(Continued)

FOREIGN PATENT DOCUMENTS

| | | | |
|---|---|---|---|
| JP | 2000152930 A | 6/2000 | |
| JP | 2008068017 A | 3/2008 | |

(Continued)

OTHER PUBLICATIONS

International Search Report for International Application No. PCT/EP2018/086873, filed Dec. 26, 2018, 17 pages.

*Primary Examiner* — Andre J Allen

(57) ABSTRACT

An ultrasonic transducer probe comprises an array transducer and a microbeamformer ASIC (46a, 46b) containing transmit amplifiers and receive circuitry for operation of the array transducer. For higher power operation, the drive current of the amplifiers is increased, rather than the transmit voltage. The elements of the array present a low impedance to the transmit amplifiers for increased drive current by their construction of thin layers (12) of piezoelectric material which are electrically coupled in parallel to an amplifier while being mechanically coupled in series for ultrasound transmission.

14 Claims, 3 Drawing Sheets

(58) Field of Classification Search
CPC ............. B06B 2201/76; G01S 15/8915; G01S 7/5202; G01S 7/52079; G01S 7/5208; A61B 8/12; A61B 8/4494
See application file for complete search history.

(56) References Cited

U.S. PATENT DOCUMENTS

| | | | |
|---|---|---|---|
| 8,925,386 | B2 | 1/2015 | Oshiki |
| 11,086,002 | B1 * | 8/2021 | Scampini ............ G01S 7/52095 |
| 2005/0099096 | A1 | 5/2005 | Baumgartner et al. |
| 2006/0264747 | A1 | 11/2006 | Freeman et al. |
| 2009/0146695 | A1 | 6/2009 | Schweizer et al. |
| 2010/0204582 | A1 | 8/2010 | Lu |
| 2010/0298713 | A1 | 11/2010 | Robinson |
| 2011/0237953 | A1 * | 9/2011 | Olsson ................. A61B 8/4483 |
| | | | 600/459 |
| 2016/0007961 | A1 | 1/2016 | Lee et al. |
| 2018/0003810 | A1 * | 1/2018 | Freeman ............ G01S 7/52095 |
| 2018/0317888 | A1 * | 11/2018 | Freeman ............ G01S 15/8927 |

FOREIGN PATENT DOCUMENTS

| | | | |
|---|---|---|---|
| JP | 2016064074 A | 4/2016 | |
| RU | 160325 U1 | 3/2016 | |
| SU | 215632 A1 | 7/1969 | |
| SU | 1725342 A1 | 4/1992 | |
| WO | WO-2017089376 A1 * | 6/2017 | ............. A61B 8/145 |

* cited by examiner

HIGH POWER MICROBEAMFORMER ULTRASOUND TRANSDUCER PROBE

RELATED APPLICATIONS

This application is the U.S. National Phase application under 35 U.S.C. § 371 of International Application No. PCT/EP2018/086873, filed on Dec. 26, 2018, which claims priority to and the benefit of U.S. Provisional Application Serial No. 62/612,831, filed Jan. 2, 2018. These applications are hereby incorporated by reference herein.

BACKGROUND OF THE INVENTION

This invention relates to ultrasonic diagnostic imaging systems and, in particular, to microbeamformer transducer probes for diagnostic imaging.

Ultrasonic diagnostic imaging systems are designed to operate with different kinds of ultrasound probes designed for specific imaging procedures. For instance, obstetrical probes for deep abdominal scanning generally use relatively low frequency transducers, since low frequency ultrasound will penetrate deeper into the body before depth-dependent attenuation of higher frequencies renders the images unsuitable for diagnosis. But when penetration depth is not a significant consideration, as in superficial imaging of shallower anatomy, high frequency transducers are generally preferred, as higher frequency echo signals will result in better image resolution of anatomy in finer detail.

The ultrasound beams transmitted and received by array probes are steered and focused by a beamformer, which energizes different elements at slightly different times during transmission, and delays and sums signals received by elements of the array in response to transmission. Conventionally the beamformer is housed in the ultrasound system to which the probe is connected, with each channel of the beamformer connected to an element of the array. Many of today's transducer probes, however, have element counts which exceed the number of channels of the system beamformer. The approach taken to address this dilemma is to employ an integrated circuit microbeamformer in the probe, which is capable of driving all of the array elements with transmit signals and performs at least partial beamforming, with the final beamformation of partial sum signals performed by the system beamformer. While this approach overcomes the channel count limitation, it has its own limitation, which is the transmit voltage limit of the microcircuitry of the beamformer. At higher transmit frequencies this is generally not a problem, as high frequency probes use thinner piezoelectric elements which require less voltage, and higher frequencies are used at more superficial depths where the depth of penetration requires lower voltage transmission. But lower frequency piezoelectric elements are thicker, requiring more transmit voltage, and are often used at greater depths of penetration such as is the case with obstetrical imaging. The conventional way to obtain enough drive power for deeper imaging with piezoelectric transducer elements is to increase the drive voltage. But microcircuitry operating at higher voltages must be formed of larger areas of semiconductor in the integrated circuit to obtain a given level of current drive. Thus, as drive circuitry is scaled up for higher voltages, the microbeamformer circuitry quickly becomes too large to fit inside a hand-held transducer probe. Accordingly, it is desirable to be able to provide greater transmit power in a microbeamformer transducer probe, but without the unacceptable increase in size of the microbeamformer integrated circuit components inside the probe.

BRIEF SUMMARY OF THE INVENTION

In accordance with the principles of the present invention a device for generating ultrasound imaging with micobeamforming circuitry that enables higher transmit power without excessive microbeamformer size. This is done by scaling up the drive current of the high power semiconductor components, rather than the drive voltage. While increasing the maximum drive current of a semiconductor device will increase its area, it will do so less rapidly than if the power increase is obtained with voltage. In order to build transducer elements which will draw higher current, the elements are formed of two or more thin layers of piezoelectric material which are electrically driven in parallel and operated in series mechanically, rather than the conventional single thicker layer. Since each thin layer has a lower impedance than that of a single thick layer of the piezoelectric material, the transducer element will present a lower electrical operating impedance to the current drive circuitry, and thus increase the drive current (and hence the power) for a given operating voltage. It is this combination of increasing power by increasing current and using low impedance transducer elements which enables the microbeamformer integrated circuitry to remain of a size which can fit inside the imaging device.

The imaging device is typically an ultrasound probe. Ultrasound probes are typically handheld, but may be designed to attached directly to a patient. Ultrasound probes are generally designed such that a transducer may be placed adjacent to a patient's tissue, e.g. against the skin, and transmit and receive ultrasound data within a patient. It is understood that concepts described herein may also be adapted to ultrasound probes or devices configured for insertion into a patient, e.g. catheters (IVUS, ICE, etc.), TEE probes, or those designed for cavity-based imaging (transrectal or obstetrics probes).

BRIEF DESCRIPTION OF THE SEVERAL VIEWS OF DRAWINGS

DETAILED DESCRIPTION OF THE INVENTION

Figure 1:
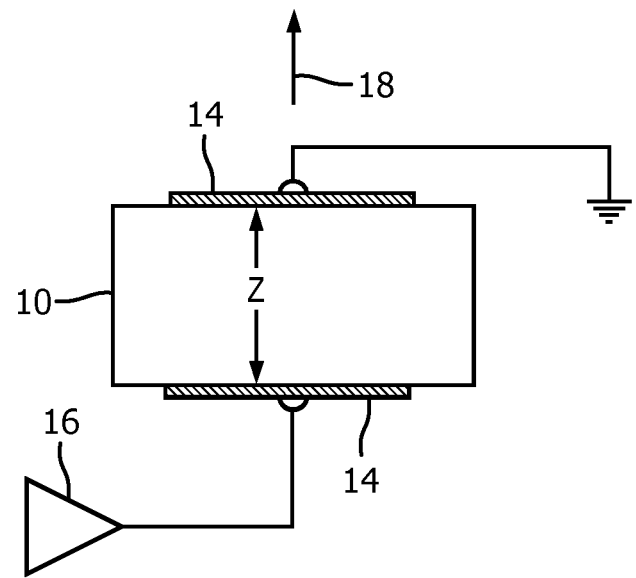
FIG. 1 illustrates a single transducer element of piezoelectric material driven by current drive circuitry.

Referring to FIG. 1, a piezoelectric transducer element 10 is shown. The transducer element has a thickness Z. As is well known the thickness and shape of a transducer element is selected to provide operation at a particular frequency or range of frequencies for a given piezoelectric material. The transducer element is actuated by applying a transmit pulse or waveform from transmit amplifier 16 of a microbeamformer in the probe with the transducer element. The transmit pulse is applied to an electrode 14 on one side of the transducer element. Another electrode 14 on top of the element is grounded for the illustrated drive arrangement. When the transmit pulse is applied to the lower electrode 14, the transducer element transmits an ultrasonic wave in the direction indicated by arrow 18.

Figure 2:
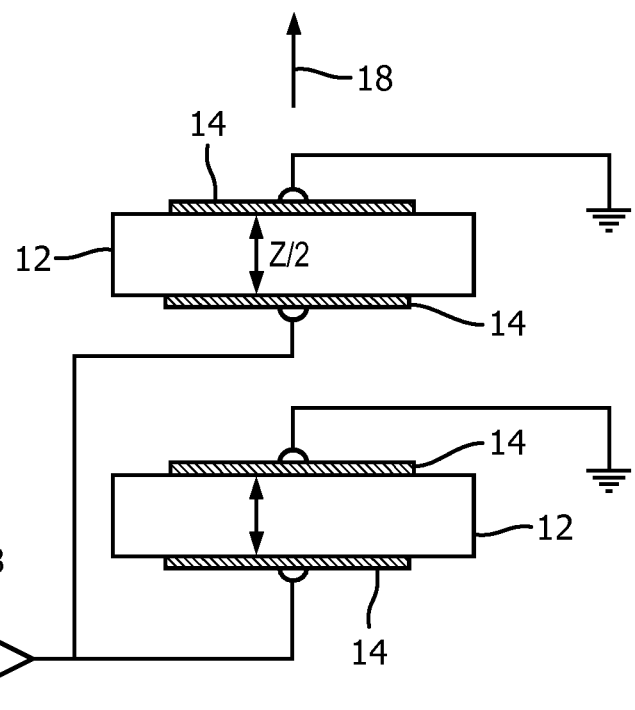
FIG. 2 illustrates a the electrical configuration of a transducer element formed of two thinner layers of piezoelectric material which are electrically driven in parallel while mechanically operated in series.

Suppose now that a higher pressure ultrasonic wave is to be transmitted for deeper penetration in the body being interrogated. The same transmit voltage is to be used. A higher pressure wave will be transmitted at the same voltage if the drive current to the element is increased. In accordance with the present invention, a preferred way to increase the current is to lower the impedance driven by the microbeamformer transmit amplifier 18. A preferred way to lower the electrical impedance presented by the transducer element is to use multiple thinner transducer elements electrically connected in parallel as shown in FIG. 2. In this example each element 12 has a thickness of Z/2, and if Z is also taken as an impedance value, the impedance presented by the two parallel impedances is Z/4. In the parallel electrical connections the current drive amplifier 18 is connected to apply transmit signals to the lower electrodes 14 of each transducer element 12, and the upper electrode of each element is grounded. The two elements 12 are mechanically arranged to operated together in series, and the emitted ultrasound wave is in the direction 18.

Figure 3:
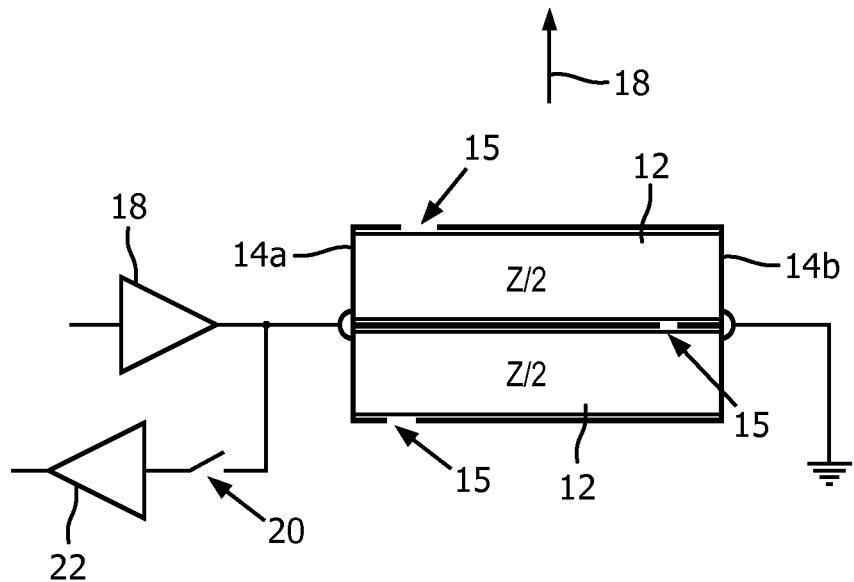
FIG. 3 illustrates a preferred construction of a transducer element formed of two thin layers operated mechanically in series and electrically driven in parallel by a current drive semiconductor component.

A preferred way to mechanically arrange the two element layers 12 to operate together in series is shown in FIG. 3. The four sides of each element layer 12 are coated with a metallized electrode material such as a gold alloy. Then voids are created in the material at the top and bottom of each element as shown at 15. The voids may be created by isolation cuts made by etching or scribing the electrode material as shown at 15 in the drawing. This will leave two electrical paths wrapping halfway around the element from the voids 15, one from the upper left and across the bottom of the element to the lower void, and another across the top and around the right side of the element to the lower void. The two element layers 12 are then bonded together, such as by adhesive bonding, with voids aligned in the contacting sides of the elements as shown in the drawing. This creates two electrodes, one (14a) on the left side of the transducer element and extending most of the length between the piezoelectric layers, and another (14b) over most of the top and bottom surfaces of the element and on the right side. The current drive amplifier 18 applies a drive signal to electrode 14a, and electrode 14b is grounded. It is seen that the two transducer element layers 12 are electrically driven in parallel, and are mechanically coupled to operate in series as a single transducer element. For completeness the receive circuitry of the microbeamformer for this element is shown on the left side of the drawing, including a transmit/receive switch 20 and a receive preamp 22.

Figure 4:
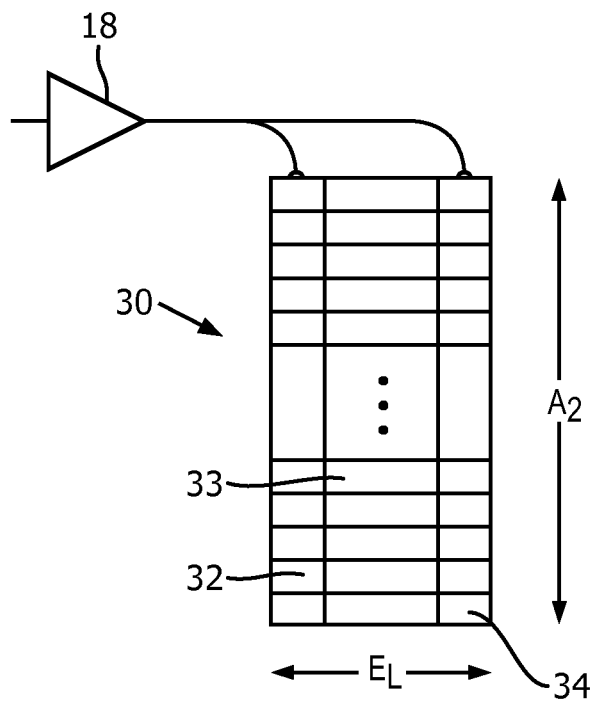
FIG. 4 illustrates a 2D array implementation of the present invention.

In a typical transducer array the two element layers 12, when joined as shown in FIG. 3, comprise one element of a transducer array. The azimuth direction of a one-dimensional (1D) array is into and out of the plane of the drawing page, and the respective elements are arranged side-by-side in the azimuth direction, separated by dicing cuts. The elements can also be arranged in a two-dimensional (2D) array configuration as shown in FIG. 4, which is a plan view of the top of a 2D array 30. A central row of elements 33 extending in the azimuth (Az) direction is flanked in elevation (El) by two rows of elements 32 and 34. The elements in the central row 33 are individually operated to transmit steered and focused ultrasound beams upward (toward the reader). The side elevation rows 32 and 34 in this example are operated together, with pairs of opposing elements driven by current drive amplifiers 18. By control of the time of actuation of the rows 32, 34 a transmit beam can be focused in elevation at a desired depth of focus. The 2D array 30 may comprise dozens or hundreds of transducer elements driven by current drive amplifiers 18 of a microbeamformer located in the transducer probe with the 2D array 30.

Figure 5:
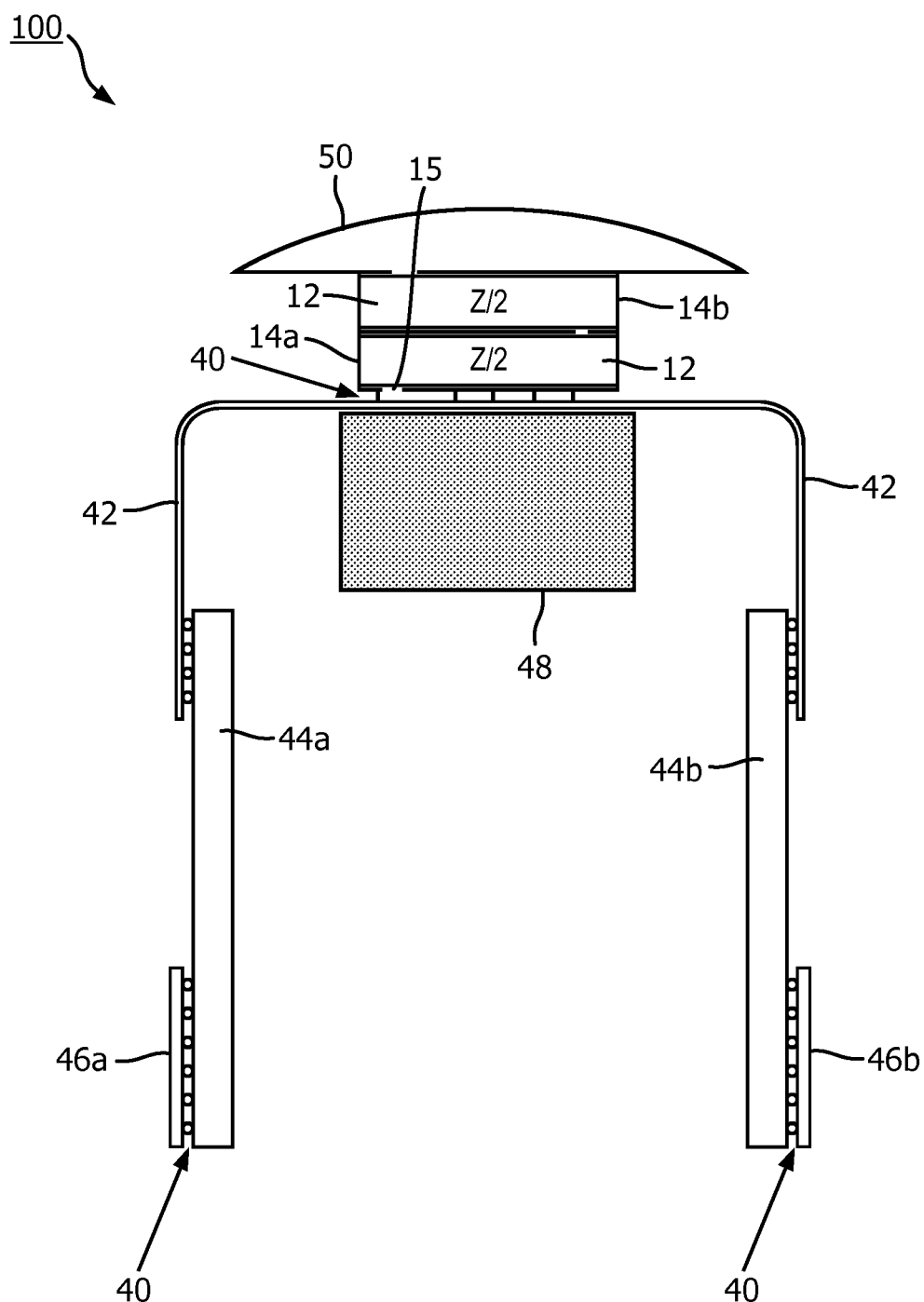
FIG. 5 illustrates a transducer stack for an array probe constructed in accordance with the principles of the present invention.

FIG. 5 illustrates a transducer stack 100 comprising a transducer array and microbeamformer configuration of the present invention which may be enclosed in a probe case with an attached probe cable to form a complete transducer probe. Each transducer element of the array comprises two piezoelectric layers 12 bonded together with electrodes 14a and 14b as shown and explained in conjunction with FIG. 3. The azimuth direction of this transducer array is into and out of the plane of the drawing sheet. One or more acoustic matching layers (not shown) are located on top of transducer array as is known in the art. An acoustic lens 50 covers the transducer array and its matching layers. Located below the transducer array is an acoustic backing block 48. The transducer array is mounted on a flex circuit 42 with the electrodes 14a, 14b of each transducer element electrically coupled to conductive traces of the flex circuit. In this example the electrical coupling of the electrodes to the flex circuit traces is accomplished by solder balls indicated at 40. The ends of the flex circuit 42 are electrically coupled to printed circuit boards (pcbs) 44a and 44b. Mounted on the pcbs 44a, 44b, and in electrical communication with the transducer array by way of the flex circuit, are microbeamformer ASICs 46a and 46b, which contain the current drive amplifiers and receive circuitry for each element of the transducer array. Since increased current rather than increased voltage is used to increase the transmit power of the array, the areas of the ASICs 46a, 46b occupied by the current drive components are increased, but not to the extent as is the case with increased voltage, enabling the microbeamformer ASICs and transducer stack to fit within the dimensions of a typical probe case.

Not shown in FIG. 5 is the probe cable, which would have one end coupled to the pcbs 44a and 44b and extend from the probe case to an ultrasound system connector end.

It should be noted that an ultrasound system suitable for use with an ultrasound probe construction of the present invention may be implemented in hardware, software or a combination thereof. The various embodiments and/or components of an ultrasound system may be implemented as part of one or more computers or microprocessors. The computer or processor may include a computing device, an input device, a display unit and an interface, for example, for accessing the Internet. The computer or processor may include a microprocessor. The microprocessor may be connected to a communication bus, for example, to access a PACS system or the data network for importing high and low frequency images. The computer or processor may also include a memory. The memory devices may include Random Access Memory (RAM) and Read Only Memory (ROM). The computer or processor further may include a storage device, which may be a hard disk drive or a removable storage drive such as a floppy disk drive, optical disk drive, solid-state thumb drive, and the like. The storage device may also be other similar means for loading computer programs or other instructions into the computer or processor.

As used herein, the term "computer" or "module" or "processor" or "workstation" may include any processor-based or microprocessor-based system including systems using microcontrollers, reduced instruction set computers (RISC), application-specific integrated circuits (ASICs), logic circuits, and any other circuit or processor capable of executing the functions described herein. The above examples are exemplary only, and are thus not intended to limit in any way the definition and/or meaning of these terms.

The computer or processor executes a set of instructions that are stored in one or more storage elements, in order to process input data. The storage elements may also store data or other information as desired or needed. The storage element may be in the form of an information source or a physical memory element within a processing machine.

The set of instructions of an ultrasound system including those controlling the acquisition, processing, and transmission of ultrasound images as described above may include various commands that instruct a computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules such as a neural network model module, a program module within a larger program or a portion of a program module. The software also may include modular programming in the form of object-oriented programming. The processing of input data by the processing machine may be in response to operator commands, or in response to results of previous processing, or in response to a request made by another processing machine.

Furthermore, the limitations of the following claims are not written in means-plus-function format and are not intended to be interpreted based on 35 U.S.C. 112, sixth paragraph, unless and until such claim limitations expressly use the phrase "means for" followed by a statement of function devoid of further structure.

What is claimed is:

1. An ultrasound device for operating at drive currents for increased transmit power comprising:
    a transducer array; and
    a microbeamformer integrated circuit located in the device and comprising a plurality of current drive amplifiers adapted to provide a drive current to actuate elements of the transducer array during ultrasonic transmission,
    wherein the transducer array comprises transducer elements configured to be actuated by the drive current,
    wherein at least one transducer element of the array comprises a plurality of piezoelectric layers that are (1) electrically coupled in parallel to a current drive amplifier of the microbeamformer integrated circuit and (2) mechanically coupled in series for ultrasonic transmission, and
    wherein a transmit power of the transducer array is adapted to be increased by increasing the drive current.

2. The ultrasound device of claim 1, wherein the transducer elements are arranged as a 1D array.

3. The ultrasound device of claim 1, wherein the transducer elements are arranged as a 2D array.

4. The ultrasound device of claim 1, wherein the plurality of piezoelectric layers of the transducer element are mechanically coupled in series in a direction of ultrasound transmission.

5. The ultrasound device of claim 4, wherein the at least one transducer element comprises a first electrode coupled to one side of each piezoelectric layer and a second electrode coupled to another side of each piezoelectric layer of the plurality of piezoelectric layers.

6. The ultrasound device of claim 5, wherein a number of the plurality of piezoelectric layers comprises two, the first electrode comprises a metallized coating in contact with a first side of an upper piezoelectric layer and a first side of a lower piezoelectric layer, and the second electrode comprises a metallized coating in contact with a second side of the upper piezoelectric layer and a second side of the lower piezoelectric layer.

7. The ultrasound device of claim 6, wherein a current drive amplifier of the microbeamformer integrated circuit is coupled to the first electrode and the second electrode is coupled to ground.

8. The ultrasound device of claim 6, wherein the metallized coating at the first side of the upper piezoelectric layer is bonded to the metallized coating at the first side of the lower piezoelectric layer.

9. The ultrasound device of claim 6, wherein the first electrode and second electrodes each further comprise a continuous metallized layer around a piezoelectric layer comprising isolation cuts for electrically separating the electrodes.

10. The ultrasound device of claim 1, wherein the microbeamformer integrated circuit comprises receive circuitry coupled to each transducer element of the transducer array.

11. The ultrasound device of claim 1, comprising a printed circuit board, wherein the microbeamformer integrated circuit comprises an ASIC located on the printed circuit board.

12. The ultrasound device of claim 11, further comprising a flex circuit adapted to electrically couple the microbeamformer integrated circuit to the elements of the transducer array.

13. The ultrasound device of claim 12, further comprising an acoustic backing block located on a first side of the transducer array.

14. The ultrasound device of claim 13, further comprising an acoustic lens located on a second side of the transducer array.

* * * * *